United States Patent
Cordes et al.

(10) Patent No.: US 8,033,494 B2
(45) Date of Patent: Oct. 11, 2011

(54) BELT RETRACTOR WITH AXIAL SECURING AND METHOD FOR THE PRODUCTION THEREOF

(75) Inventors: Jens Cordes, Senden (DE); Jochen Lang, Ulm (DE); Rolf Schnetzer, Blaubeuren (DE); Robert Fleischmann, Neu-Ulm/Pfuhl (DE); Günter Klaiber, Setzingen (DE); Andreas Maunz, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 198 days.

(21) Appl. No.: 12/453,337

(22) Filed: May 7, 2009

(65) Prior Publication Data

US 2009/0277986 A1 Nov. 12, 2009

(30) Foreign Application Priority Data

May 9, 2008 (DE) .......................... 10 2008 023 036

(51) Int. Cl.
*B65H 75/48* (2006.01)
(52) U.S. Cl. .................. 242/379; 242/379.1; 242/379.2
(58) Field of Classification Search .................. 242/379, 242/379.1–379.2
See application file for complete search history.

(56) References Cited

U.S. PATENT DOCUMENTS

| | | | |
|---|---|---|---|
| 4,177,962 A * | 12/1979 | Hildebrandt | 242/383.5 |
| 4,431,145 A * | 2/1984 | Kassai | 242/383.4 |
| 4,619,419 A * | 10/1986 | Essler | 242/376.1 |
| 6,439,494 B1 * | 8/2002 | Specht et al. | 242/379.1 |
| 6,592,064 B2 * | 7/2003 | Clute et al. | 242/379.1 |
| 6,851,716 B2 * | 2/2005 | Bullinger et al. | 280/806 |
| 6,921,039 B2 | 7/2005 | Schmid | |
| 2004/0031872 A1 | 2/2004 | Schmid | |
| 2004/0195421 A1 | 10/2004 | Singer et al. | |
| 2007/0200022 A1 | 8/2007 | Jabusch et al. | |

FOREIGN PATENT DOCUMENTS

| | | |
|---|---|---|
| DE | 202 12 591 U1 | 2/2003 |
| DE | 203 05 088 U1 | 9/2003 |
| DE | 103 37 252 A1 | 2/2004 |
| DE | 103 43 195 A1 | 10/2004 |
| DE | 103 44 435 A1 | 5/2005 |
| DE | 103 48 853 A1 | 5/2005 |
| DE | 10 2004 048 436 A1 | 4/2006 |
| DE | 10 2005 056 124 A1 | 5/2007 |
| DE | 10 2006 023 258 B3 | 10/2007 |
| WO | WO 2005/037616 A1 | 4/2005 |
| WO | WO 2005/037617 A1 | 4/2005 |

\* cited by examiner

*Primary Examiner* — Sang Kim

(74) *Attorney, Agent, or Firm* — Foley & Lardner LLP (57) ABSTRACT

The invention is concerned, inter alia, with a belt retractor (10) for a seat belt, with a belt reel (20) for winding up and unwinding the seat belt, and a lockable locking flange (40) which is connected to the belt reel and, prior to a locking action, is rotated together with the belt reel and, after a locking action, is blocked in its rotational movement.

According to the invention, it is provided that the locking flange and the belt reel are secured against relative axial displacement.

14 Claims, 6 Drawing Sheets

BELT RETRACTOR WITH AXIAL SECURING AND METHOD FOR THE PRODUCTION THEREOF

The invention is concerned with a belt retractor for a seat belt, with a belt reel for winding up and unwinding the seat belt, and a lockable locking flange which is connected to the belt reel and, prior to a locking action, rotates together with the belt reel and, after a locking action, is blocked in its rotational movement.

As is known, belt retractors of this type are used, for example, in motor vehicles.

The invention is based on the object of making further improvements to a belt retractor of the described type.

This object is achieved according to the invention by a belt retractor for a seat belt, with a belt reel for winding up and unwinding the seat belt, and a lockable locking flange which is connected to the belt reel and, prior to a locking action, is rotated together with the belt reel and, after a locking action, is blocked in its rotational movement, wherein the locking flange and the belt reel are secured against relative axial displacement. Advantageous refinements of the belt retractor according to the invention are specified in dependent claims.

According thereto, it is provided according to the invention that the locking flange and the belt reel are secured against axial displacement relative to each other.

A substantial advantage of the belt retractor according to the invention is that, owing to the axial securing, the locking flange and belt reel can be preassembled, and therefore said two components can be inserted into the belt retractor in preassembled form.

A further substantial advantage of the belt retractor according to the invention is that, in the event of locking of the locking flange, it is avoided that the locking flange and belt reel can be separated from each other in the axial direction and, for example, tilting of the locking flange and belt reel can occur.

According to an advantageous refinement of the belt retractor, it is provided that the locking flange and the belt reel are plugged together along the belt reel axis by a section of one of the two abovementioned elements, i.e. of the locking flange or of the belt reel, which section has an annular groove, being inserted into the other element in each case, the other element has at least one insertion opening and at least one insertion channel which extends from the insertion opening in the direction of the groove of the first element, and the groove and the insertion channel are separated from each other by a separating section which is pressed into the groove and connects the other element to the first element. Secure axial fixing between the belt reel and locking flange is achieved by means of the separating section which is pressed into the groove, with it nevertheless remaining ensured, owing to the annular groove, that the locking flange and belt reel can be rotated in relation to each other when the locking flange is locked.

The separating section which is pressed into the groove can have any cross section, no matter whether round, oval, angular, polygonal or else differently shaped.

The separating section is preferably formed by a thin-walled section of the other element which is pressed into the groove of the first element. If, for example, the first element is the locking flange and the other element is the belt reel, then the axial securing is achieved by pressing a thin-walled section of the belt reel into the groove of the locking flange. A substantial advantage of this refinement of the separating section is that, in order to form the axial securing, use is exclusively made of the groove of the first element and material, namely wall material, of the other element; additional elements or additional parts for forming the axial securing are not required.

According to an alternative refinement of the separating section, it is provided that the latter is formed by a stopper which is pressed through the insertion channel onto the groove of the first element, whether the belt reel or the locking flange. Although, in this refinement, a separate element is required for the axial securing between the locking flange and belt reel, an additional degree of freedom is obtained: for example, a suitable choice of material for the stopper results in the stopper sliding with little friction in the groove when the belt reel is rotated relative to the locked locking flange; as an alternative, the stopper material may also be selected in such a manner that a certain desired friction occurs if, for example, a relative rotation is to take place only after a predetermined minimum torque.

According to a further preferred refinement of the belt retractor, it is provided that the locking flange and the belt reel are plugged together along the belt reel axis by a section of one of the two abovementioned elements, i.e. of the locking flange or of the belt reel, which section has an annular groove, being inserted into the other element in each case, the other element has at least one feed opening and at least one feed channel which connects the feed opening and the groove to each other, and the feed channel and the groove are filled with a connecting element.

The connecting element is preferably composed of a hardened material which has been fed in solid, viscous, liquid or gaseous form into the feed channel and the annular groove and has subsequently been hardened. In such a refinement, it is possible to transfer the production of the connecting element into the region of the feed channel and of the groove such that an optimum fitting shape of the connecting element in the feed channel and the groove is ensured. Hardening of the material of the connecting element directly on or next to the groove results in an optimum form-fitting connection between the belt reel and locking flange, which in turn leads to optimum axial fixing between the belt reel and the locking flange.

The material of the connecting element is preferably a crosslinked or crosslinkable material or alternatively also a material, the melting point of which is lower than the melting point of the belt reel material and lower than the melting point of the locking flange material. For example, the material of the connecting element is a polymer material, a silicone material or a metal or metal mixture.

The other element, i.e. the belt reel or the locking flange, can also have a plurality of feed channels which each have an individual associated feed opening and connect said feed openings to the groove.

According to a further advantageous refinement of the belt retractor, it is provided that at least one pin which runs parallel to the belt reel axis is attached to the locking flange, one pin end of the pin is guided through an associated through hole in the belt reel, and the pin end is secured against slipping through the through hole. A rotationally fixed, axial connection between the belt reel and locking flange is achieved by the at least one pin running parallel to the belt reel axis.

By means of suitable dimensioning of the pin or of the pins, for example a suitable selection of the cross-sectional area of the pins, it is possible to set a certain shearing force or a certain force level above which the pin shears off and the connection between the locking flange and belt reel is broken. Said force level can be defined, for example, with regard to the interaction with a further belt force limiting device, for example a torsion bar: in this case, the force level predetermines a minimum force threshold which has to be exceeded before the belt reel can rotate relative to the locking flange and the further belt force limiting device can act.

The pin ends are preferably secured against slipping through by the pin ends being deformed in such a manner that their cross section no longer fits through the respectively associated through hole.

Furthermore, it is considered advantageous if the pins are cast on the locking flange. This keeps the number of parts in the belt retractor low and simplifies the pin production.

The pins are preferably produced from the same material as the locking flange. If the locking flange is produced, for example, from zinc and the spindle from aluminum, the pins are preferably likewise produced from zinc. Zinc is more easily deformable than aluminum, and therefore axial securing of the pin ends against slipping through is more easily possible than in the case of pins made of aluminum.

In the case of the described embodiment of the belt retractor with a pin or pins for axially fixing the belt reel and the locking flange, the axial fixing ceases after the locking flange is locked and after the pins have sheared off, and therefore the locking flange and belt reel are subsequently displaceable relative to each other.

According to a further advantageous refinement of the belt retractor, it is provided that the locking flange and the belt reel are plugged together along the belt reel axis by a section of one of the two abovementioned elements, i.e. of the locking flange or of the belt reel, being inserted into the other element in each case, and there is a clamping device between the inserted section of the first element and the other element, said clamping device clamping the other element and the inserted section of the first element to each other. Such a clamping device, if appropriately geometrically configured, has the advantage of achieving a relatively uniform distribution of the clamping forces between the belt reel and locking flange. In addition, during the assembly, the clamping device can merely be plugged onto the one or other element or inserted between the two elements, which requires relatively little outlay on assembly and is therefore relatively cost-effective. Furthermore, the clamping device also does not require an annular groove in one or the other element, and therefore the production of such a groove can advantageously be dispensed with.

The clamping device preferably has blocking sections which extend transversely with respect to the belt reel axis and block axial displacement of the two elements relative to each other. The effect which can be achieved in the event of such a refinement of the blocking sections is that only axial securing is achieved between the belt reel and locking flange whereas a rotational movement between the locking flange and belt reel remains possible. For example, if the locking flange is locked, the belt reel can nevertheless be rotated relative to the locking flange.

In order to simplify a rotational movement between the belt reel and locking flange, it is considered advantageous if the blocking sections have sliding slopes which extend parallel to the belt reel axis and bear against the first and/or the second element and make it easier for the two elements to rotate relative to each other. By means of the configuration of the sliding slopes, it is possible, for example, to set the amount of torque required in order to cause relative rotation between the belt reel and locking flange.

If the clamping device is to permit relative rotation between the belt reel and locking flange only above a predetermined minimum torque, then further blocking sections can furthermore be provided, said blocking sections extending along the belt reel axis and making it more difficult for the two elements to rotate relative to each other; the minimum torque above which a relative rotational movement of the belt reel is possible is defined in accordance with the configuration and number of such further blocking sections.

The clamping device can have, for example, a cylindrical, angular or conical basic body. Such a basic body can be formed, for example, by a sheet-metal part with a corresponding curvature, that is to say, for example, a sheet-metal part with a cylindrical curvature, angular curvature or conical curvature.

The basic body preferably has a continuous separating slot such that the diameter or the cross section of the basic body can be varied resiliently and can be expanded or reduced in size: this permits optimum adaptation to the locking flange and belt reel.

The blocking sections and/or the further blocking sections can be formed, for example, by lamellae or latching lugs.

With regard to minimal production costs, it is considered advantageous if the blocking sections and/or the further blocking sections are formed by sections of the sheet-metal part of the clamping device that have been punched and bent over at a predetermined angle; this is because, in such a configuration, the entire clamping device can be produced as a single part by a single curved and punched sheet-metal part.

In order to ensure adequate mechanical load-bearing capacity of the clamping device, it is considered advantageous if the material of the clamping device is harder than the material of the belt reel and of the locking flange, or is at least harder than those material sections of the belt reel and of the locking flange with which the clamping device comes into contact.

According to a further advantageous refinement of the belt retractor, it is provided that the belt retractor has a torsion bar which is adhesively bonded at its one torsion bar end to the belt reel and is fixedly connected axially at its other torsion bar end to the locking flange. In this refinement of the belt retractor, the axial securing between the belt reel and locking flange can be brought about solely by the torsion bar.

The torsion bar is adhesively bonded, for example, at its other torsion bar end to the locking flange. In this refinement, the axial securing between the belt reel and locking flange is achieved solely by the torsion bar and two adhesive bonding surfaces.

The invention is furthermore concerned with an arrangement with a shaft and a hub.

With regard to such an arrangement, it is provided according to the invention that the shaft and the hub are secured against relative axial displacement. Advantageous refinements of the shaft/hub arrangement according to the invention are described in dependent claims. With regard to the advantages of the shaft/hub arrangement according to the invention, reference is made to the above embodiments in conjunction with the belt retractor according to the invention.

The invention is furthermore concerned with a method for connecting a belt reel to a lockable locking flange.

With regard to such a method, it is provided according to the invention that the locking flange and the belt reel are secured against relative axial displacement. With regard to the advantages of the method according to the invention, reference is made to the above embodiments in conjunction with the belt retractor according to the invention.

Advantageous refinements of the method according to the invention are specified in dependent claims.

The invention is explained in more detail below with reference to exemplary embodiments; by way of example here

For the sake of clarity, the same reference numbers are always used for identical or comparable components in the figures.

Figure 1:
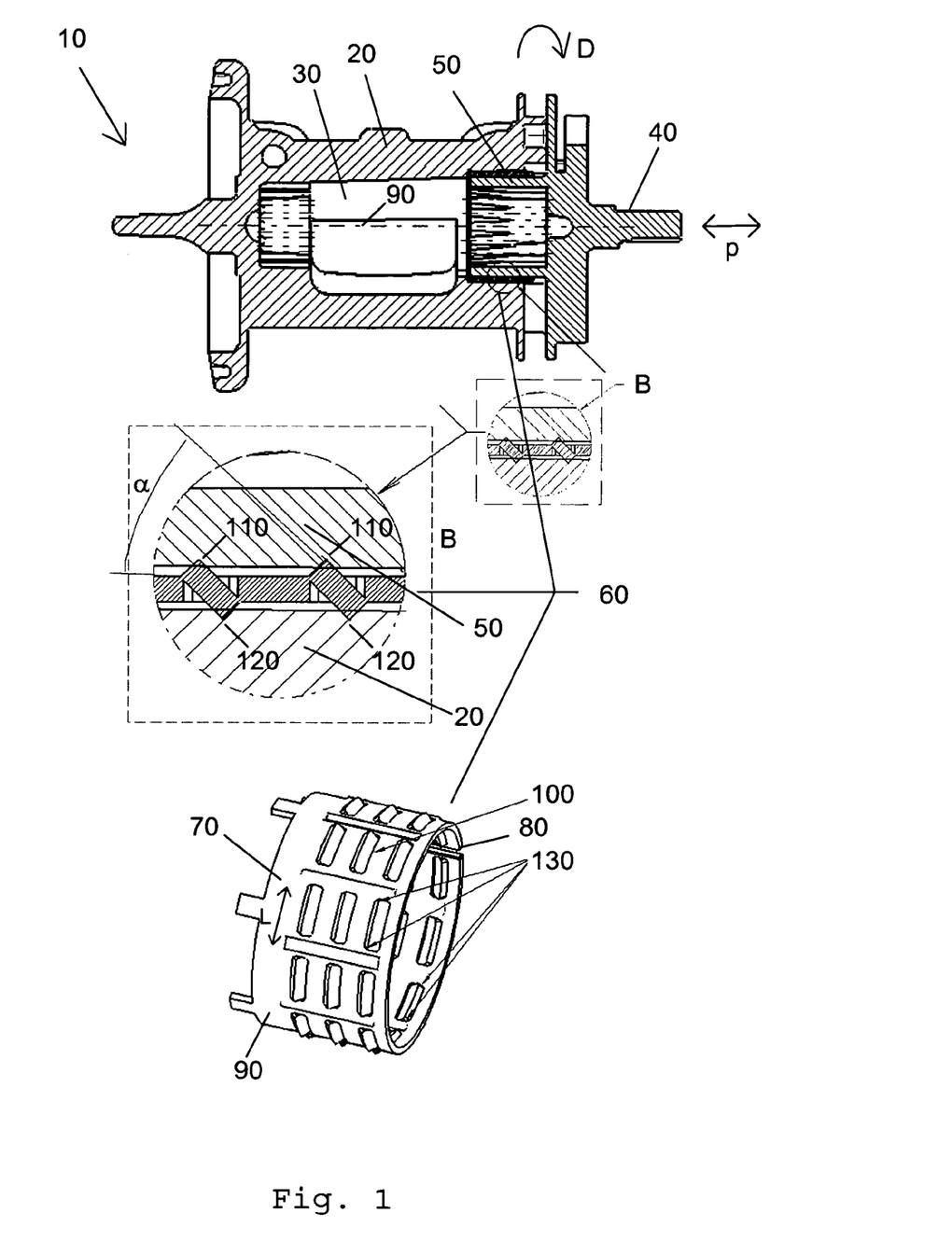
FIG. 1 shows a first exemplary embodiment of a belt retractor according to the invention and of a shaft/hub connection according to the invention in which a clamping device is arranged between the belt reel and locking flange.

FIG. 1 shows a belt reel 20 of a belt retractor 10, and indicates a torsion bar 30 running within the belt reel 20, and a lockable locking flange 40. A section 50 of the locking flange 40 is inserted into the belt reel 20 and is clamped thereto by means of a clamping device 60.

The clamping device 60 is formed by an approximately cylindrical basic body 70 which has a separating slot 80. The separating slot 80 runs parallel to the belt reel axis 90 of the belt reel 20. The clamping device 60 can be formed for example, by a cylindrically curved sheet-metal part 95 by blocking sections 100 in the form of lamellae or latching lugs being formed by punching and bending over.

The angle by which the blocking sections 100 are bent over in relation to the belt reel axis 90 is indicated in FIG. 1 by the reference symbol α.

As can be seen in FIG. 1, the blocking sections 100 are of elongate configuration, with the longitudinal axis L thereof extending transversely with respect to the belt reel axis 90 of the belt reel 20. The blocking sections 100 have edges 110 and 120 which are pressed into the belt reel material of the belt reel 20 and into the locking flange material of the locking flange 40 and, as a result, bring about axial fixing between the belt reel 20 and the locking flange 40. It is therefore not possible, or is possible at least only with very great difficulty, to pull the section 50 of the locking flange 40 out of the belt reel 20 along the arrow direction P. This is shown very clearly by the picture detail B in FIG. 1.

The blocking sections 100 furthermore have sliding slopes 130 which are each attached to both ends of each blocking section 100. The sliding slopes 130 therefore extend parallel to the belt reel axis 90 and make it easier for or permit relative rotation between the belt reel 20 and the locking flange 40.

In summary, the clamping device 60 according to FIG. 1 serves to bring about axial securing of the locking flange 40 in the belt reel 20 such that the locking flange 40 cannot move along the belt reel axis 90 or along the arrow direction P relative to the belt reel 20. However, on account of the configuration of the blocking sections 100 and on account of the presence of the sliding slopes 130, the clamping device 60 is suitable at the same time for permitting rotation along the direction of rotation D, and therefore the belt reel 20 and the locking flange 40 can be rotated relative to each other, for example when the locking flange 40 is locked in its rotational movement.

In order to assemble the belt retractor 10 according to FIG. 1, the clamping device 60 is preferably placed onto the section 50 of the locking flange 40 and pushed together therewith into the belt reel 20. The spring action of the blocking sections 100 causes the latter to become wedged with the belt reel 20 and with the locking flange 40 in each case counter to the axial traction direction between the belt reel 20 and locking flange 40 such that axial securing between the belt reel 20 and locking flange 40 is achieved. Nevertheless, because of the sliding slopes 130 of the blocking sections 100, rotational movement between the belt reel 20 and locking flange 40 is maintained as soon as a small minimal torsional force is applied.

One advantage of the exemplary embodiment according to FIG. 1 is that an axial fixing of the locking flange 40 of the belt reel 20 does not require any annular groove, as is the case in other solutions. The assembly of the locking flange 40 of the belt reel 20 is also possible in a very simple manner. Furthermore, a relatively uniform distribution of the forces between the locking flange 40 and belt reel 20 over the entire circumference of both parts is achieved.

Figure 2:
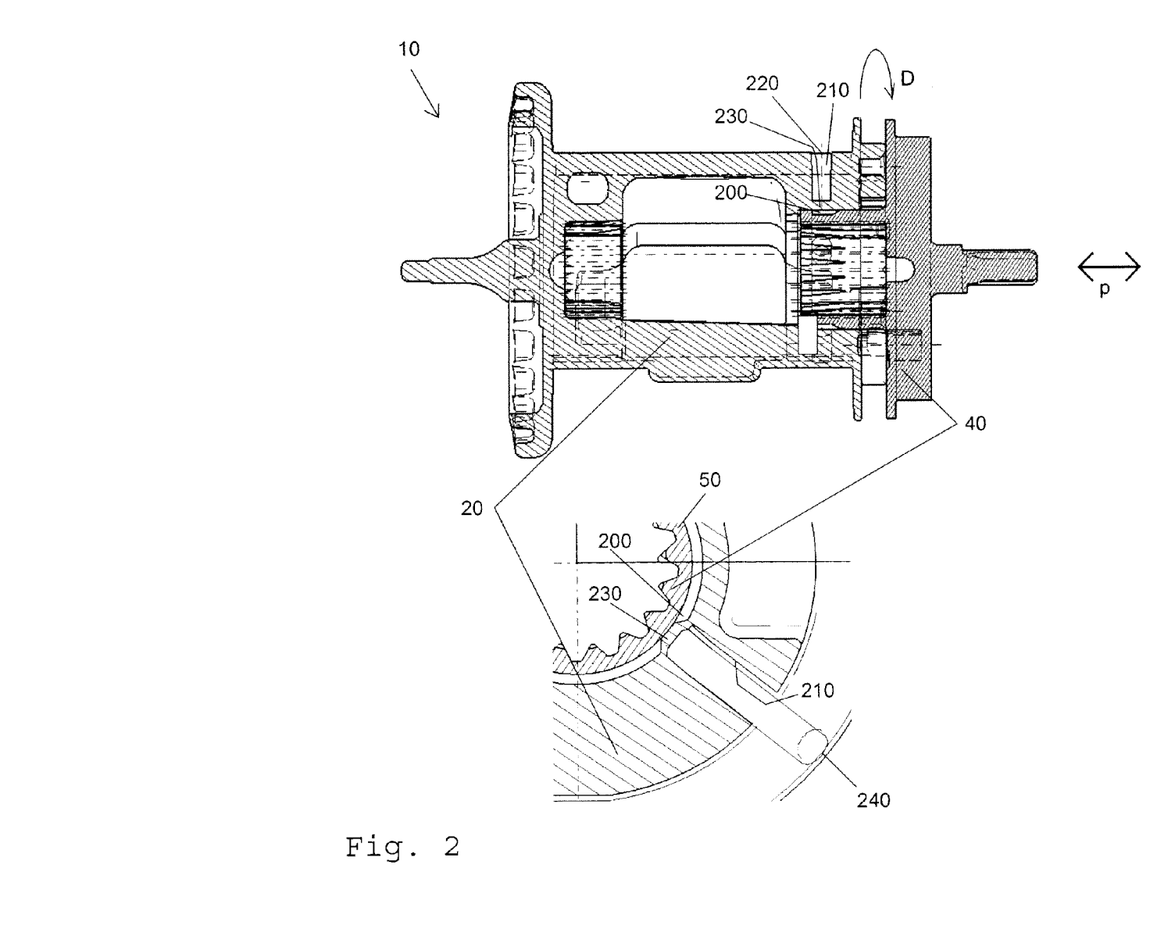
FIG. 2 shows a second exemplary embodiment of a belt retractor according to the invention and of a shaft/hub connection according to the invention in which belt reel material is pressed into an annular groove of the locking flange and axial securing is brought about between the locking flange and belt reel, with relative rotation between the belt reel and locking flange being maintained.

FIG. 2 shows a second exemplary embodiment of a belt retractor 10. It can be seen that the section 50 of the locking flange 40 has an annular groove 200 which is located within the belt reel 20.

The belt reel 20 is equipped with one or more insertion channels 210 which each extend from an externally accessible insertion opening 220 as far as an associated separating section 230. The separating section or separating sections 230 is or are composed of the material of the belt reel 20 and separate(s) the insertion channel 210 from the annular groove 200.

For the assembly, the section 50 of the locking flange 40 is inserted together with the annular groove 200 into the belt reel 20 until the annular groove 200 is located in the region of the insertion channel 210. Subsequently, a pressing tool 240, which may be, for example, a punch or the like, is used to press the separating sections 230 of the belt reel 20 into the annular groove 200 such that the separating sections 230 are deformed and bring about a form-fitting connection between the belt reel 20 and the locking flange 40.

Since the groove 200 is annular, relative rotation between the belt reel 20 and locking flange 40 remains possible even after the separating section or separating sections 230 is or are deformed; only axial displacement of the locking flange 40 relative to the belt reel 20 or pulling of the locking flange 40 out of the belt reel 20 is prevented.

In the exemplary embodiment according to FIG. 2, the form-fitting connection between the belt reel 20 and the locking flange 40 is brought about by compressed material of the belt reel 20, namely by the separating sections 230 which belong to the belt reel 20 being pressed into the groove 200. As an alternative, it is also possible to configure the insertion channel 210 to be continuous such that the insertion opening 220 has direct access to the groove 200 in the locking flange

Figure 6:
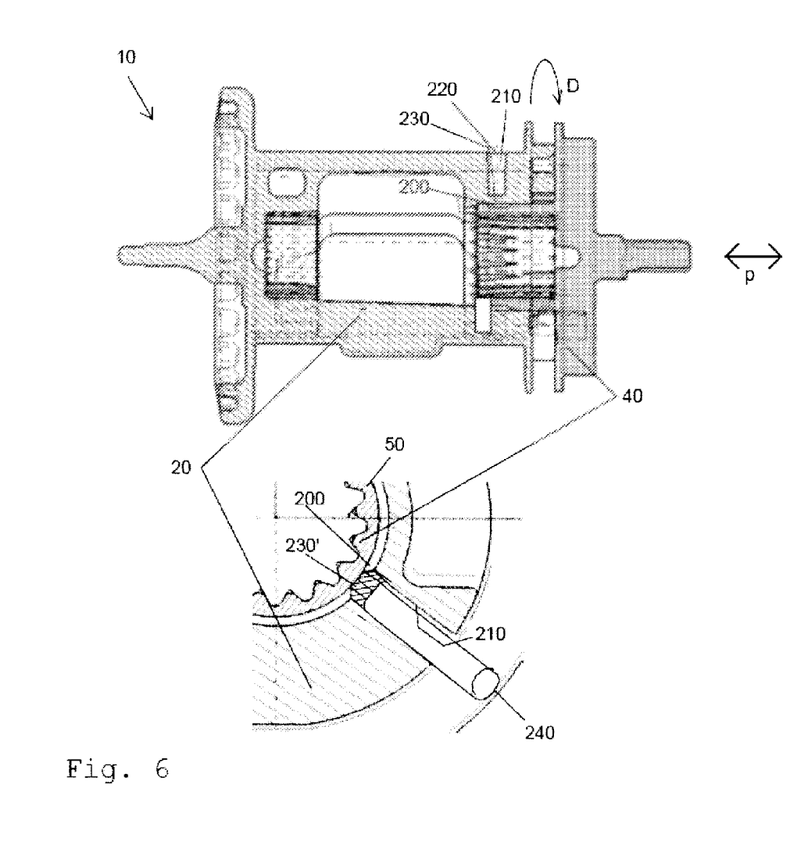
FIG. 6 shows a belt retractor according to the invention and of a shaft/hub connection according to the invention in which belt reel material is pressed into an annular groove of the locking flange and axial securing is brought about between the locking flange and belt reel, with relative rotation between the belt reel and locking flange being maintained.

40. In such a case, the form-fitting connection between the belt reel 20 and locking flange 40 is achieved by a separate stopper 230' which is inserted through the insertion opening 220 into the insertion channel 210 and is pressed by the punch 240 into the groove 200 (FIG. 6).

Figure 3:
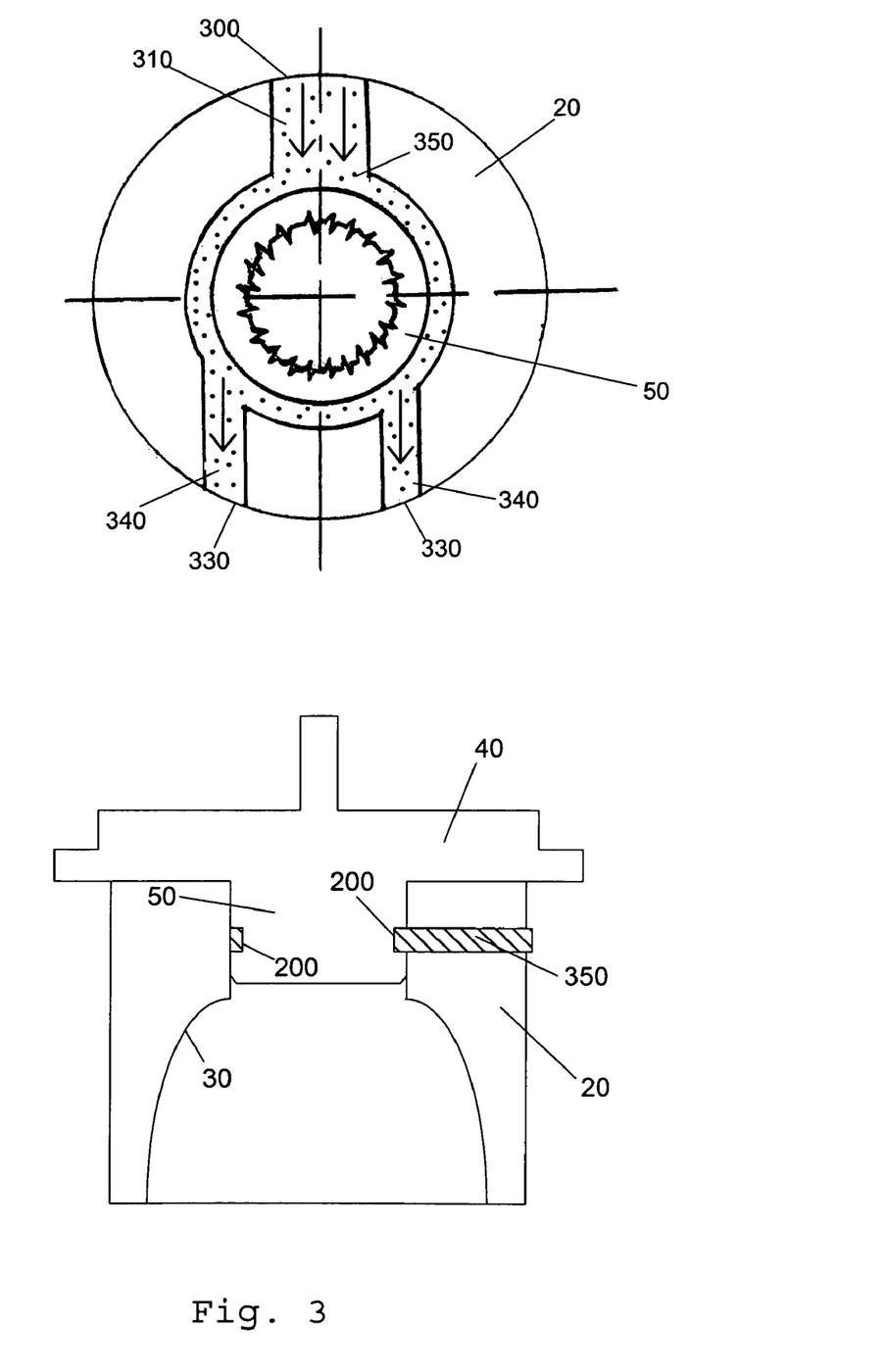
FIG. 3 shows a third exemplary embodiment of a belt retractor according to the invention and of a shaft/hub connection according to the invention in which a connecting element between the belt reel and locking flange is formed in a groove of the locking flange by hardening of a flowable material.

FIG. 3 shows an exemplary embodiment of a belt retractor 10, in which a section 50 of the locking flange 40 is inserted into the belt reel 20 and has an annular groove 200.

The annular groove 200 is accessible from the outside, since the belt reel 20 namely has a feed opening 300 and an associated feed channel 310 which connects the feed opening 300 to the groove 200.

In addition, the belt reel 20 is provided with outlet openings 330 which are connected to the groove 200 via outlet channels 340.

For the assembly of the belt reel and of the locking flange, the section 50 of the locking flange 40 is inserted into the belt reel 20, and then a flowable material 350 is fed through the feed opening 300 into the feed channel 310. The flowable material 350 runs through the feed channel 310 to the groove 200 and from there via the two outlet channels 340 to the outlet openings 330. If the outlet openings 330 are closed, the flowable material 350 cannot run out through the latter, and therefore the outlet channels 340, the groove 200 and the insertion channel 310 are filled with the flowable material 350. As soon as the entire inner region including the annular groove 200 are filled with the flowable material 350, the latter is hardened in a hardening step. The hardening can take place, for example, thermally by the flowable material 350 being heated to a certain hardening temperature.

As soon as the flowable material 350 is hardened, a form-fitting connection is achieved between the belt reel 20 and the locking flange 40. Said form-fitting connection brings about axial securing of the section 50 of the locking flange 40 within the belt reel 20 such that the locking flange 40 can no longer be removed from the belt reel 20.

However, depending on the properties of the material 350, rotation between the belt reel and the locking flange may be possible if, after the material 350 has hardened, said material has a surface which is relatively low in friction. In the case of a low coefficient of friction, rotation between the belt reel 20 and locking flange 40 is possible even when torsional moments are relatively low, whereas relatively high torsional forces are required in the case of a relatively high coefficient of friction.

Figure 4:
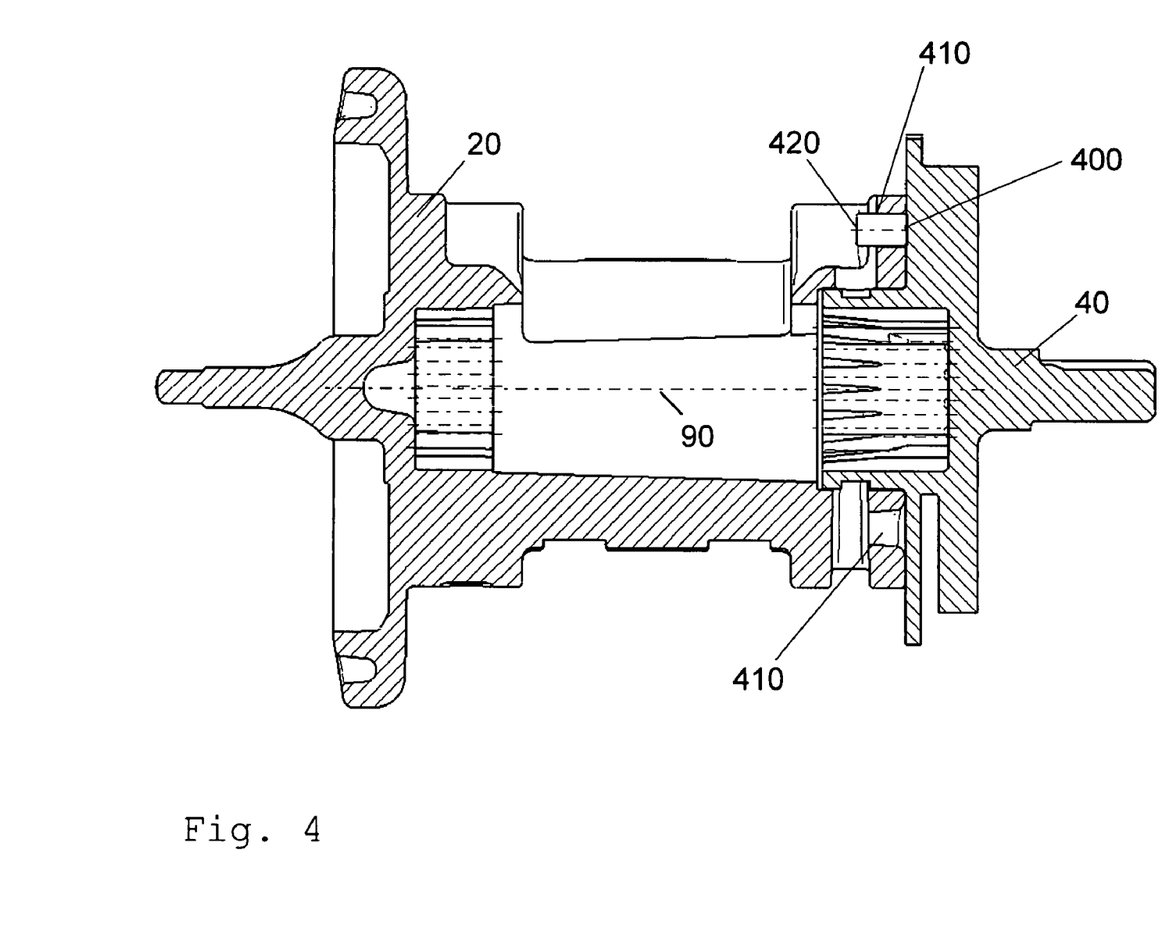
FIG. 4 shows a fourth exemplary embodiment of a belt retractor according to the invention, in which the locking flange is equipped with pins which engage in the belt reel and bring about axial and also rotational securing between the belt reel and locking flange.

FIG. 4 illustrates a fourth exemplary embodiment of a belt retractor. It can be seen that two pins 400 are attached to, preferably cast on, the locking flange 40. The two pins 400 run parallel to the belt reel axis 90.

The pins 400 are each assigned through holes 410 in the belt reel 20. The through holes 410 are arranged in such a manner that the pin ends 420 of the pins 400 protrude therethrough.

In order to assemble the locking flange 40 in the belt reel 20, the pin ends 420 of the pins 400 are pushed through the through holes 410. The pin ends 420 are subsequently secured by, for example, being deformed. Owing to the deformation, the cross section of the pin ends 420 no longer fits through the through holes 410, and therefore the pins 400 are fixed in their position relative to the belt reel 20. Axial securing between the belt reel 20 and the locking flange 40 is therefore achieved.

The pins 400 not only bring about axial securing between the belt reel 20 and the locking flange 40, but furthermore also rotational securing. If the belt reel is moved, the locking flange 40 inevitably rotates at the same time. If a locking of the locking flange 40 now occurs, the pins 400 will shear off as soon as an appropriate shearing force is exerted on them. Shearing off of the pins 400 therefore brings about a separation of the locking flange 40 from the belt reel 20 such that the axial securing between the belt reel and locking flange is eliminated.

A predetermined shearing force which is at least required in order to achieve a rotational movement between the belt reel 20 and locking flange 40 can be predetermined in accordance with the design of the cross-sectional area of the pins 400. Said force level defined by the predetermined shearing force can be combined with belt force limiters, for example in the form of torsion bars, in order, for example, to achieve a two- or multi-stage force level profile for the restricting of the belt force of the belt retractor 10.

Figure 5:
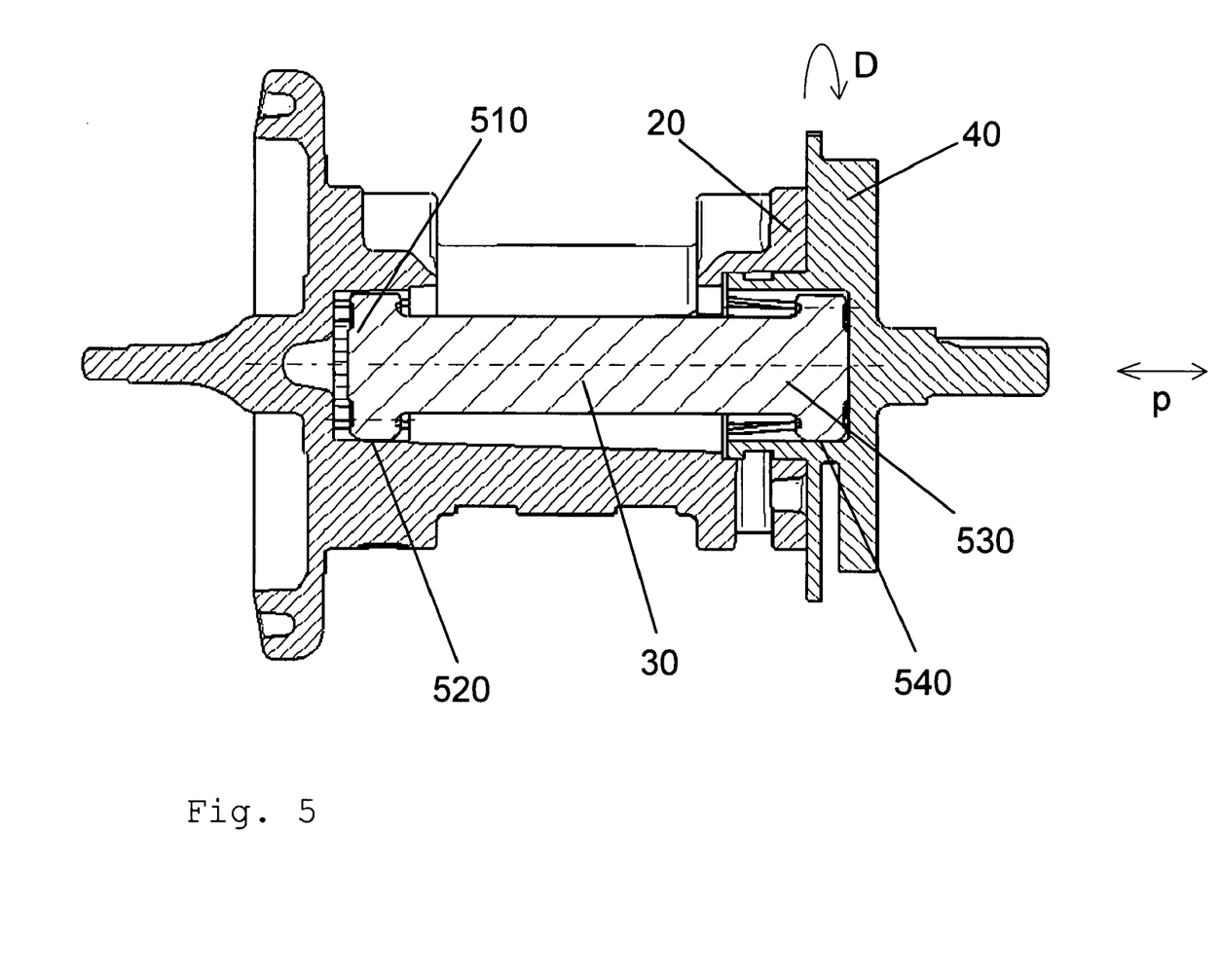
FIG. 5 shows a fifth exemplary embodiment of a belt retractor according to the invention, in which axial securing is formed by means of a torsion bar which is located within the belt reel and is adhesively bonded at its one end to the belt reel and at its other end to the locking flange.

FIG. 5 illustrates a fifth exemplary embodiment of a belt retractor. In said fifth exemplary embodiment, the axial securing between the locking flange 40 and the belt reel 20 is formed by the torsion bar 30 which is adhesively bonded to the locking flange 40 and the belt reel 20. One torsion bar end 510 is adhesively bonded at an adhesive bonding point 520 to the belt reel 20 and the other torsion bar end 530 is adhesively bonded at a further adhesive bonding point 540 to the locking flange 40. The two adhesive bonding points 520 and 540 bring about axial securing which prevents relative displacement of the locking flange 40 relative to the belt reel 20.

In order to ensure that the torsion bar 30 can absorb the required torsional forces, said torsion bar has, at its two torsion bar ends 510 and 530, a respective driver contour for which the belt reel 20 and the locking flange 40 each have a matching cutout in negative form. The torsion bar 30 is preferably adhesively bonded with its two torsion bar ends 510 and 530 in the region of the driver contour and of the cutout in the belt reel 20 and the locking flange 40.

As an alternative the adhesive bonding point 540 according to FIG. 5 can also be omitted by the torsion bar 30 being pressed with its torsion bar end 530 into the locking flange 40. In such a case, an additional adhesive bonding is namely not required. In this refinement, the torsion bar end 510 is therefore only adhesively bonded to the belt reel 20 at the adhesive bonding point 520.

In summary, exemplary embodiments of a belt retractor according to the invention may comprise any of the following features and/or any combination thereof:

- A locking flange and the belt reel are secured against relative axial displacement.
- The locking flange and the belt reel are plugged together along the belt reel axis (90) by a section (50) of one of the two abovementioned elements, i.e. of the locking flange or of the belt reel, which section has an annular groove (200), being inserted into the other element in each case.
- The other element has at least one insertion opening (220) and at least one insertion channel (210) which extends from the insertion opening in the direction of the groove of the first element, and the groove and the insertion channel are separated from each other by a separating section (230) which is pressed into the groove and connects the other element to the first element.
- A separating section is formed by a thin-walled section of the other element, which section is pressed into the groove of the first element.
- A separating section is formed by a stopper which is pressed through the insertion channel onto the groove of the first element.
- The locking flange and the belt reel are plugged together along the belt reel axis by a section of one of the two abovementioned elements, i.e. of the locking flange or of the belt reel, which section has an annular groove (200), being inserted into the other element in each case.

The other element has at least one feed opening (300) and at least one feed channel (310) which connects the feed opening and the groove to each other, and the feed channel and the groove are filled with a connecting element.

A connecting element is composed of a hardened material (350) which has been fed in liquid form into the feed channel and the annular groove.

Material of the connecting element is a crosslinked material or a material, the melting point of which is lower than the melting point of the belt reel material and lower than the melting point of the locking flange material.

Material of the connecting element is a polymer material, a silicone material or a metal or metal mixture.

The other element has a plurality of feed channels which in each case connect an associated feed opening and the groove to each other.

At least one pin (400) which runs parallel to the belt reel axis is attached to the locking flange.

One pin end (420) of the pin is guided through an associated through hole (410) in the belt reel, and the pin end is secured against slipping through the through hole.

A pin end is deformed and its cross section no longer fits through the through hole.

A pin is cast on the locking flange.

The pin is composed of a zinc-containing material, in particular of zinc.

The locking flange and the belt reel are plugged together along the belt reel axis by a section of one of the two abovementioned elements, i.e. of the locking flange or of the belt reel, being inserted into the other element in each case, and there is a clamping device (60) between the inserted section of the first element and the other element, said clamping device clamping the other element and the inserted section of the first element to each other.

The clamping device has blocking sections (100) which extend transversely with respect to the belt reel axis and block axial displacement of the two elements relative to each other.

The blocking sections have sliding slopes (130) which extend parallel to the belt reel axis and bear against the first and/or the second element and make it easier for the two elements to rotate relative to each other.

The clamping device has further blocking sections which extend along the belt reel axis and make it more difficult for the two elements to rotate relative to each other.

The clamping device has a cylindrical basic body (70), in particular such a basic body with a continuous separating slot (80).

The clamping device is formed by a sheet-metal part (95) with a cylindrical, angular or conical curvature.

The blocking sections (100) and/or the further blocking sections are formed by lamellae or latching lugs.

The blocking sections and/or the further blocking sections are formed by sections of the sheet-metal part that have been punched and bent over at a predetermined angle ($\alpha$).

The material of the clamping device is harder than the material of the belt reel and of the locking flange, or is at least harder than those material sections of the belt reel and of the locking flange with which the clamping device comes into contact.

The belt retractor has a torsion bar (30) which is adhesively bonded at its one torsion bar end (510) to the belt reel and is fixedly connected at its other torsion bar end (530) to the locking flange.

The torsion bar is adhesively bonded at its other torsion bar end to the locking flange.

Exemplary embodiments of an arrangement with a shaft and a hub according to the invention may comprise any of the following features and/or any combination thereof:

The shaft and the hub are secured against relative axial displacement.

The shaft and the hub are plugged together along the shaft axis by a section of one of the two above-mentioned elements, i.e. of the shaft or of the hub, which section has an annular groove, being plugged into the other element in each case.

The other element has at least one feed opening and at least one feed channel which connects the feed opening and the groove to each other, and the feed channel and the groove are filled with a connecting element.

The shaft and the hub are plugged together along the shaft axis by a section of one of the two above-mentioned elements, i.e. of the shaft or of the hub, which section has an annular groove, being inserted into the other element in each case.

The other element has at least one insertion opening and at least one insertion channel which extends from the insertion opening in the direction of the groove of the first element.

The groove and the insertion channel are separated from each other by a separating section which is pressed into the groove and connects the other element to the first element.

There is a clamping device between the hub and the shaft, sad clamping device clamping the other element and the inserted section of the first element to each other.

Exemplary embodiments of a method for connecting a belt reel (20) for winding up and unwinding the seat belt to a lockable locking flange (30) of a belt retractor may comprise any of the following features and/or any combination thereof:

The locking flange and the belt reel are secured against relative axial displacement.

The locking flange and the belt reel are plugged together along the belt reel axis by a section of one of the two abovementioned elements, i.e. of the locking flange or of the belt reel, which section has an annular groove, being inserted into the other element in each case, with the other element having at least one feed opening and at least one feed channel which connects the feed opening and the groove to each other.

The feed channel and the groove are filled with a connecting element.

The connecting element is produced from a material which is fed in liquid form into the feed channel and the annular groove and is subsequently hardened.

The connecting element is produced from a crosslinkable material or a material, the melting point of which is lower than the melting point of the belt reel material and lower than the melting point of the locking flange material.

The connecting element is produced from a hardenable polymer material, a hardenable silicone material or a metal or metal mixture.

The other element has a plurality of feed channels which in each case connect an associated feed opening and the groove to each other, and the groove is filled with the material of the connecting element from one or more feed channels.

The locking flange and the belt reel are plugged together along the belt reel axis by a section of one of the two abovementioned elements, i.e. of the locking flange or of the belt reel, which section has an annular groove, being inserted into the other element in each case, with the other element having at least one insertion opening and at least one insertion channel which extends from the insertion opening in the direction of the groove of the first element, and the groove and the insertion channel are separated from each other by a separating section.

The separating section is pressed into the groove.

The separating section is formed by a thin-walled section of the other element.

The separating section is formed by a stopper which is pressed through the insertion channel onto the groove of the first element.

| List of Designations | |
|---|---|
| 10 | Belt retractor |
| 20 | Belt reel |
| 30 | Torsion bar |
| 40 | Locking flange |
| 50 | Section |
| 60 | Clamping device |
| 70 | Basic body |
| 80 | Separating slot |
| 90 | Belt reel axis |
| 95 | Sheet-metal part |
| 100 | Blocking section |
| 110 | Edge |
| 120 | Edge |
| 130 | Sliding slope |
| 200 | Groove |
| 210 | Insertion channel |
| 220 | Insertion opening |
| 230 | Separating section |
| 230' | Separate stopper |
| 240 | Pressing tool |
| 300 | Feed opening |
| 310 | Feed channel |
| 330 | Outlet opening |
| 340 | Outlet channel |
| 350 | Material |
| 400 | Pin |
| 410 | Through hole |
| 420 | Pin end |
| 510 | Torsion bar end |
| 520 | Adhesive bonding point |
| 530 | Torsion bar end |
| 540 | Adhesive bonding point |
| D | Direction of rotation |
| P | Arrow direction |
| α | Angle |

The invention claimed is:

1. A belt retractor for a seat belt, comprising:
a belt reel for winding up and unwinding the seat belt; and
a lockable locking flange which is connected to the belt reel and, prior to a locking action, is rotated together with the belt reel and, after a locking action, is blocked in its rotational movement,
wherein the locking flange and the belt reel are secured against relative axial displacement,
wherein the locking flange and the belt reel are plugged together along the belt reel axis by a section of a first element, wherein the first element is one of the locking flange and the belt reel, wherein the section has an annular groove that is inserted into a second element, and wherein the second element is the locking flange when the first element is the belt reel and is the belt reel when the first element is the locking flange,
wherein the second element has at least one insertion opening and at least one insertion channel which extends from the insertion opening in the direction of the annular groove of the first element, and
wherein the annular groove and the insertion channel are separated from each other by a separating section which is pressed into the annular groove and connects the second element to the first element.

2. The belt retractor as claimed in claim 1,
wherein the separating section is formed by a thin-walled section of the second ether element, which section is pressed into the annular groove of the first element.

3. The belt retractor as claimed in claim 1,
wherein the separating section is formed by a stopper which is pressed through the insertion channel onto the annular groove of the first element.

4. The belt retractor as claimed in claim 1, wherein
the second has at least one feed opening and at least one feed channel which connects the feed opening and the annular groove to each other, and
the feed channel and the annular groove are filled with a connecting element.

5. The belt retractor as claimed in claim 1, wherein
at least one pin which runs parallel to the belt reel axis is attached to the locking flange,
one pin end of the pin is guided through an associated through hole in the belt reel, and
the pin end is secured against slipping through the through hole.

6. The belt retractor as claimed in claim 5,
wherein the pin end is deformed and its cross section no longer fits through the through hole.

7. The belt retractor as claimed in claim 5,
wherein the pin is cast on the locking flange.

8. The belt retractor as claimed in claim 5,
wherein the pin is composed of a zinc-containing material, in particular of zinc.

9. The belt retractor as claimed in claim 1, wherein
there is a clamping device between the inserted section of the first element and the second element, said clamping device clamping the second element and the inserted section of the first element to each other.

10. The belt retractor as claimed in claim 1, wherein the belt retractor has a torsion bar which is adhesively bonded at its one torsion bar end to the belt reel and is fixedly connected at its other torsion bar end to the locking flange.

11. A method for connecting a belt reel for winding and unwinding a seat belt to a lockable flange of a belt retractor comprising:
securing the locking flange and the belt reel against relative axial displacement,
wherein the locking flange and the belt reel are plugged together along the belt reel axis by a section of a first element, wherein the first element is one of locking flange and the belt reel, wherein the section has an annular groove that is inserted into a second element, and wherein the second element is the locking flange when the first element is the belt reel and is the belt reel when the first element is the locking flange, wherein the second element has at least one insertion opening and at least one insertion channel which extends from the insertion opening in the direction of the annular groove of the first element, and the annular groove and the insertion channel are separated from each other by a separating section, and the separating section is pressed into the annular groove.

12. The method as claimed in claim 11, wherein
one pin end of at least one pin, which runs parallel to the belt reel axis and is attached to the locking flange, is guided through an associated through hole in the belt reel, and
the pin end is secured against slipping through the through hole.

13. The method as claimed in claim 11, wherein
the second element has at least one feed opening and at least one feed channel which connects the feed opening and the annular groove to each other, and
the feed channel and the annular groove are filled with a connecting element.

14. The method as claimed in claim 11,
wherein a torsion bar is adhesively bonded at its one torsion bar end to the belt reel and is fixedly connected at its other torsion bar end to the locking flange.

\* \* \* \* \*